US011823719B1

(12) United States Patent
Peng

(10) Patent No.: US 11,823,719 B1
(45) Date of Patent: Nov. 21, 2023

(54) HEAT-ASSISTED RECORDING HEAD HAVING MIRROR LINER THAT REDUCES EVANESCENT COUPLING WITH NEAR FIELD TRANSDUCER

(71) Applicant: Seagate Technology LLC., Fremont, CA (US)

(72) Inventor: Chubing Peng, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/875,859

(22) Filed: Jul. 28, 2022

(51) Int. Cl.
*G11B 5/31* (2006.01)
*G11B 7/1387* (2012.01)
*G11B 5/48* (2006.01)
*G11B 5/60* (2006.01)
*G11B 5/00* (2006.01)

(52) U.S. Cl.
CPC ............ *G11B 5/314* (2013.01); *G11B 5/4866* (2013.01); *G11B 5/6088* (2013.01); *G11B 7/1387* (2013.01); *G11B 2005/0021* (2013.01)

(58) Field of Classification Search
None
See application file for complete search history.

(56) References Cited

U.S. PATENT DOCUMENTS

| 9,852,753 | B2 | 12/2017 | Peng | |
|---|---|---|---|---|
| 10,068,596 | B2 | 9/2018 | Staffaroni et al. | |
| 10,964,340 | B1 | 3/2021 | Chen et al. | |
| 2004/0001421 | A1* | 1/2004 | Tawa | G11B 5/488 369/112.28 |
| 2010/0123967 | A1* | 5/2010 | Batra | G11B 5/3116 360/59 |
| 2010/0214685 | A1* | 8/2010 | Seigler | G11B 5/4866 360/59 |
| 2017/0249962 | A1* | 8/2017 | Peng | G11B 5/6088 |
| 2018/0096702 | A1* | 4/2018 | Staffaroni | G11B 5/3133 |

* cited by examiner

*Primary Examiner* — Peter Vincent Agustin
(74) *Attorney, Agent, or Firm* — Mueting Raasch Group

(57) ABSTRACT

A recording head has a near-field transducer proximate a media-facing surface of the recording head. A waveguide overlaps and delivers light to the near-field transducer, the light having a near-infrared wavelength. Two subwavelength focusing mirrors are at an end of the waveguide proximate the media-facing surface. The subwavelength mirrors are on opposite crosstrack sides of the near-field transducer and separated from a peg of the near-field transducer by a gap. The subwavelength focusing mirrors each include a core having a first edge exposed at the media-facing surface. The core formed of a core material that is resistant to mechanical wear and corrosion, such as a dielectric or robust metal. A liner covers a second edge of the core facing the near-field transducer. The liner includes a plasmonic metal that is has a plasmonic frequency in the ultraviolet range.

18 Claims, 10 Drawing Sheets

HEAT-ASSISTED RECORDING HEAD HAVING MIRROR LINER THAT REDUCES EVANESCENT COUPLING WITH NEAR FIELD TRANSDUCER

SUMMARY

The present disclosure is directed to a heat-assisted recording head having mirror liner that reduces evanescent coupling with a near field transducer. In one embodiment, a recording head includes a near-field transducer proximate a media-facing surface of the recording head. A waveguide overlaps and delivers light to the near-field transducer, the light having a near-infrared wavelength. The recording head includes a pair of subwavelength focusing mirrors at an end of the waveguide proximate the media-facing surface. The subwavelength focusing mirrors are located on opposite crosstrack sides of the near-field transducer. The subwavelength focusing mirrors are separated from a peg of the near-field transducer at the media-facing surface by a gap of less than 50 nm. Each of the subwavelength focusing mirrors includes a core comprising a first edge exposed at the media-facing surface and a liner covering a second edge of the core facing the near-field transducer. The core is formed of a core material that is resistant to mechanical wear and corrosion. The liner includes a plasmonic metal that is different than the core material and that has at least one of: a plasmonic frequency in an ultraviolet range; and an extinction coefficient greater than 6.

In another embodiment, a recording head includes a near-field transducer proximate a media-facing surface of the recording head. A waveguide overlaps and delivers light to the near-field transducer, the light having a near-infrared wavelength. The recording head includes a pair of subwavelength focusing mirrors at an end of the waveguide proximate the media-facing surface. The subwavelength focusing mirrors are located on opposite crosstrack sides of the near-field transducer. Each of the subwavelength focusing mirrors includes a core comprising a first edge exposed at the media-facing surface and a liner covering a second edge of the core facing the near-field transducer. The core formed of a core material that is resistant to mechanical wear and corrosion. The liner includes Al, Mg, or In or alloys thereof. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

A HAMR write transducer described below uses a subwavelength mirror that overlaps part of the NFT in an area near the air bearing surface (ABS), which may also be referred to herein as a media-facing surface. Generally, the subwavelength mirror has dimensions along its reflecting surface (e.g., the length of curve that forms the reflective surface) that are smaller than the wavelength of the incident light (e.g., near infrared, between 760 nm to 1500 nm, 830 nm in some embodiments).

The subwavelength mirror focuses incident waveguide light onto the NFT to assist waveguide-NFT coupling. The subwavelength mirror also functions as an optical side shield to block background light to recording media. Therefore, the laser current used for writing can be reduced and thermal gradient improved by addition of this mirror. In order to obtain optimum optical performance, the mirror can be made from a noble metal such as Au and Rh that has good optical and thermal characteristics. However, it has been found that Au and similar noble metals can exhibit evanescent coupling with nearby portions of the NFT (e.g., peg) reducing efficiency of the NFT. This occurs on designs where the opening between the subwavelength mirror narrows past a certain dimension. The present disclosure describes additional features improve NFT performance with a subwavelength mirror in these designs.

Figure 1:
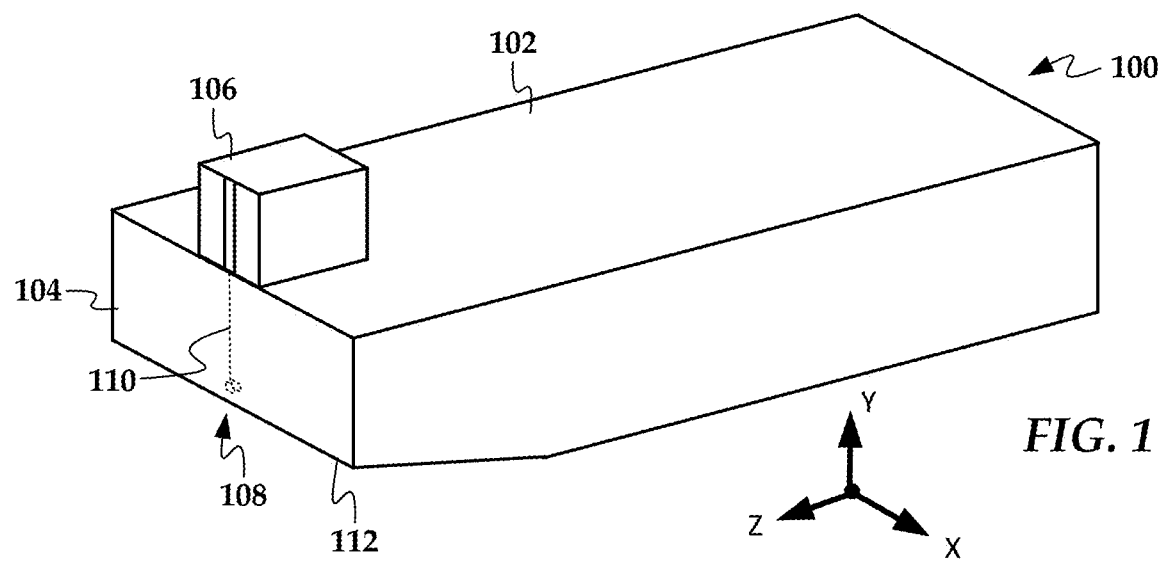
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
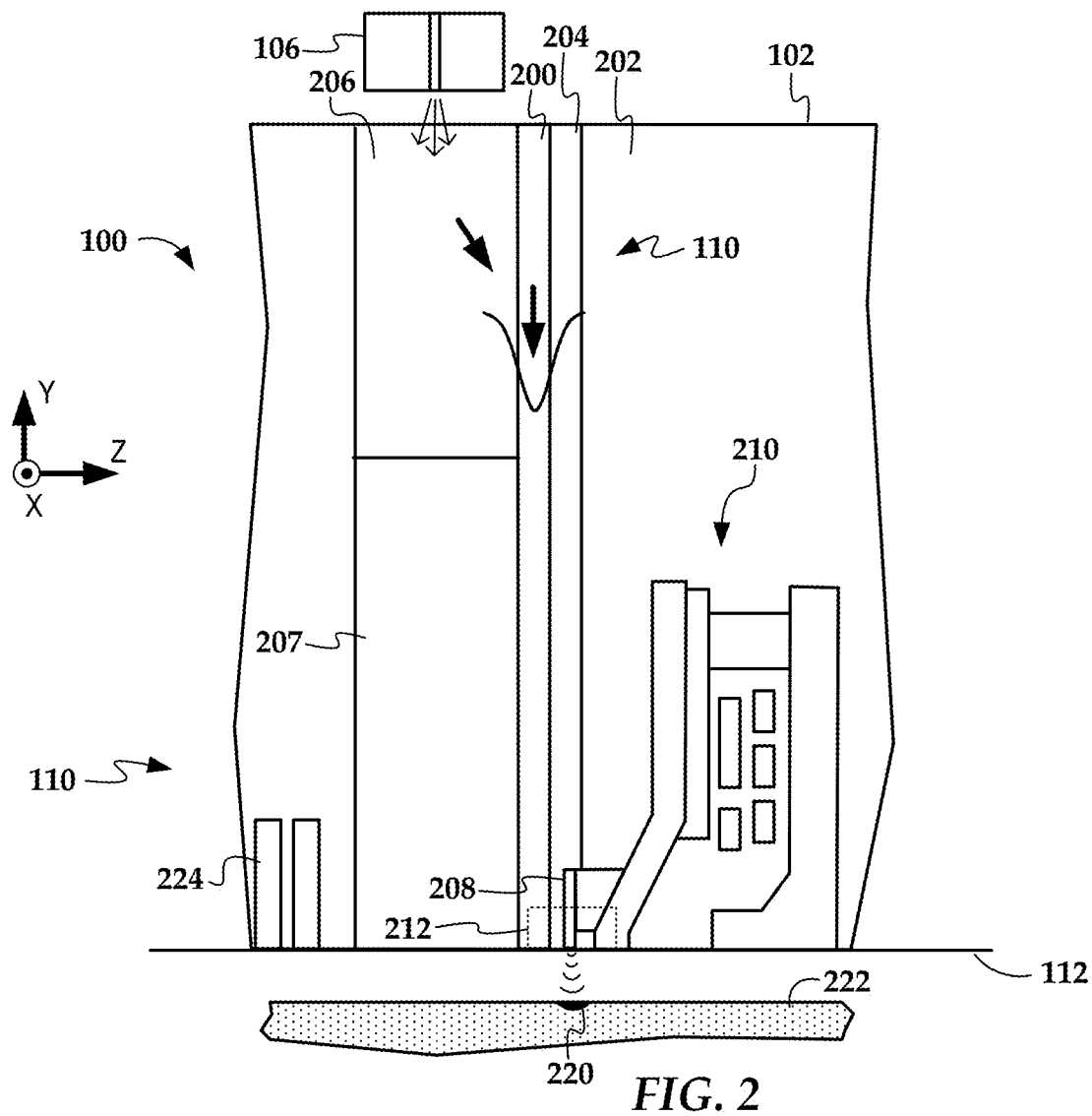
FIG. 2 is a cross-sectional view of a slider along a down-track plane according to according to an example embodiment.
Figure 3:
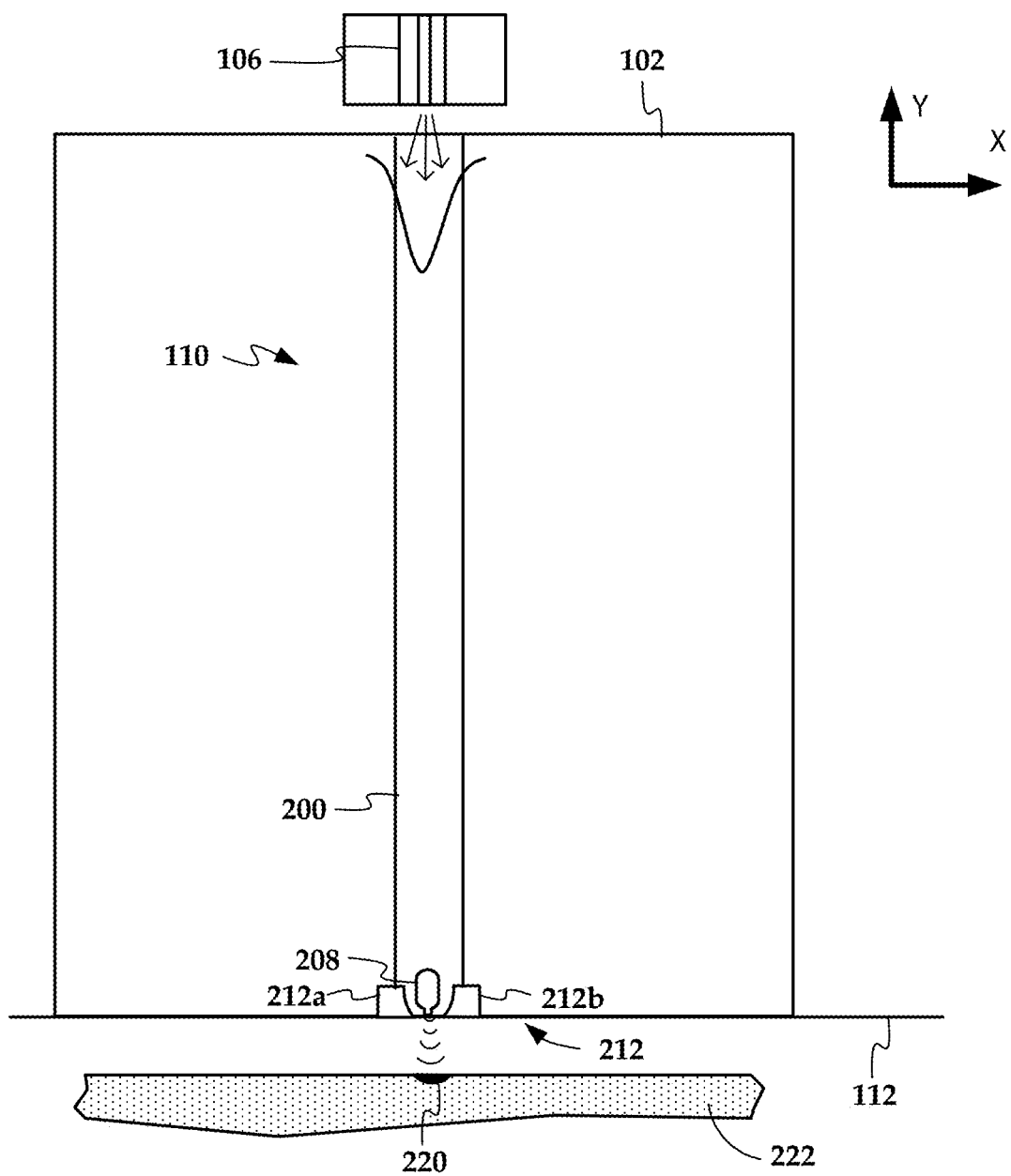
FIG. 3 is a wafer plane view of a slider according to an example embodiment.

In FIGS. 2 and 3, respective cross-sectional and wafer plane views of the slider body 102 show a light delivery system according to an example embodiment. The slider body includes an NFT 208, a magnetic writer 210 and a micro-sized focusing mirror assembly 212, referred to herein as a subwavelength mirrors, subwavelength focusing mirrors, subwavelength solid immersion mirrors (SIMs), mini-SIMs, mSIMs, etc. Light, emitting from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. Note that other waveguide and input coupler arrangements may be used with the NFT 208 and mirror assembly 212.

The NFT 208 has an enlarged part with two curved ends and a protruded peg. Other shapes may be possible for the enlarged part of the NFT 208, e.g., rectangular, triangular. The NFT 208 is placed proximate a side cladding layer 204 and top cladding layer 202 of the waveguide 110 and near the waveguide core 200. The NFT 208 could be also placed into the waveguide core 200. The NFT 208 achieves plasmonic resonance in response to the light coupled via the waveguide 110 and creates a small hotspot 220 on a recording medium 222 during recording.

A magnetic reader 224 is shown down-track from the NFT 208 and writer 210. The magnetic reader 224 may include a magneto-resistive stack that changes resistance in response to changes in magnetic field detected from the recording medium 222. These changes in magnetic field are converted to data by a read channel of the apparatus (e.g., hard disk drive assembly).

As best seen in FIG. 3, the subwavelength mirror assembly 212 includes mirrors 212a, 212b on either crosstrack side of the NFT 208. The mirrors 212a-b focus the incident waveguide light to the NFT 208 to assist in waveguide-NFT coupling. The mirrors 212a-b can also function as optical side shields that block background light from exiting the media-facing surface 112 to recording medium 222. The subwavelength mirrors 212a-b may utilize combinations of soft plasmonic materials and hard materials that help improve recording performance and life of the recording head 100.

Figure 4:
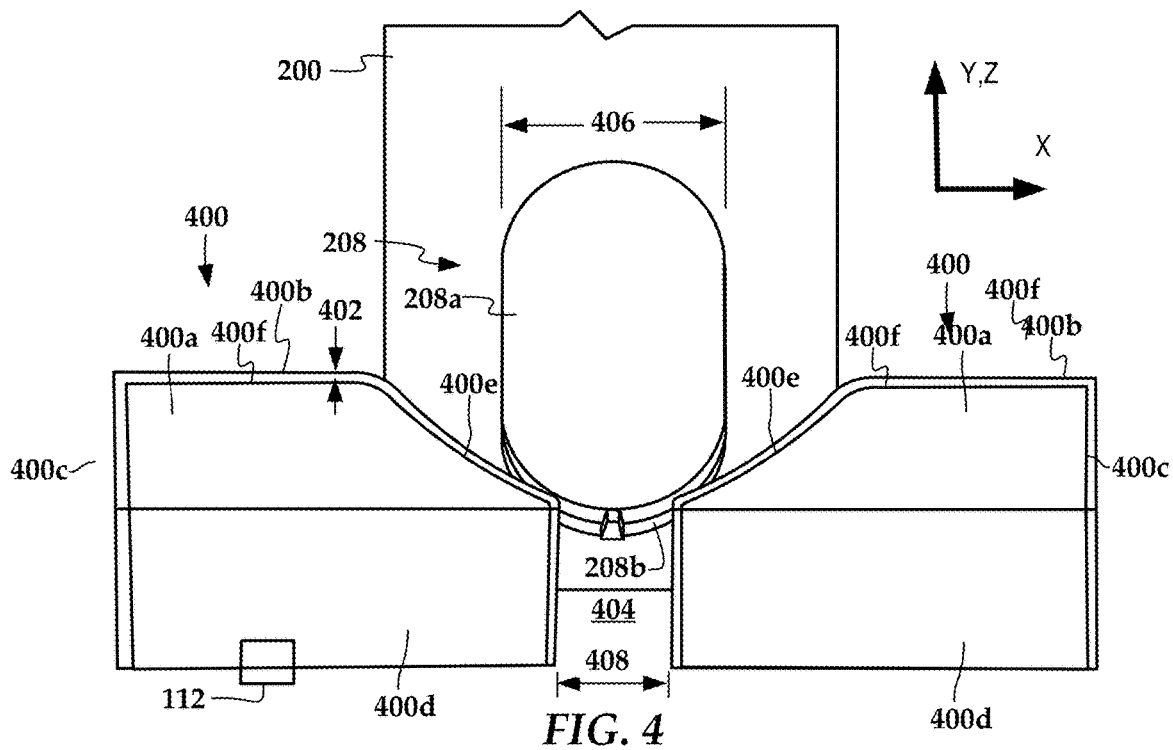
FIGS. 4 and 5 are perspective and plan views of a subwavelength mirror according to an example embodiment.
Figure 5:
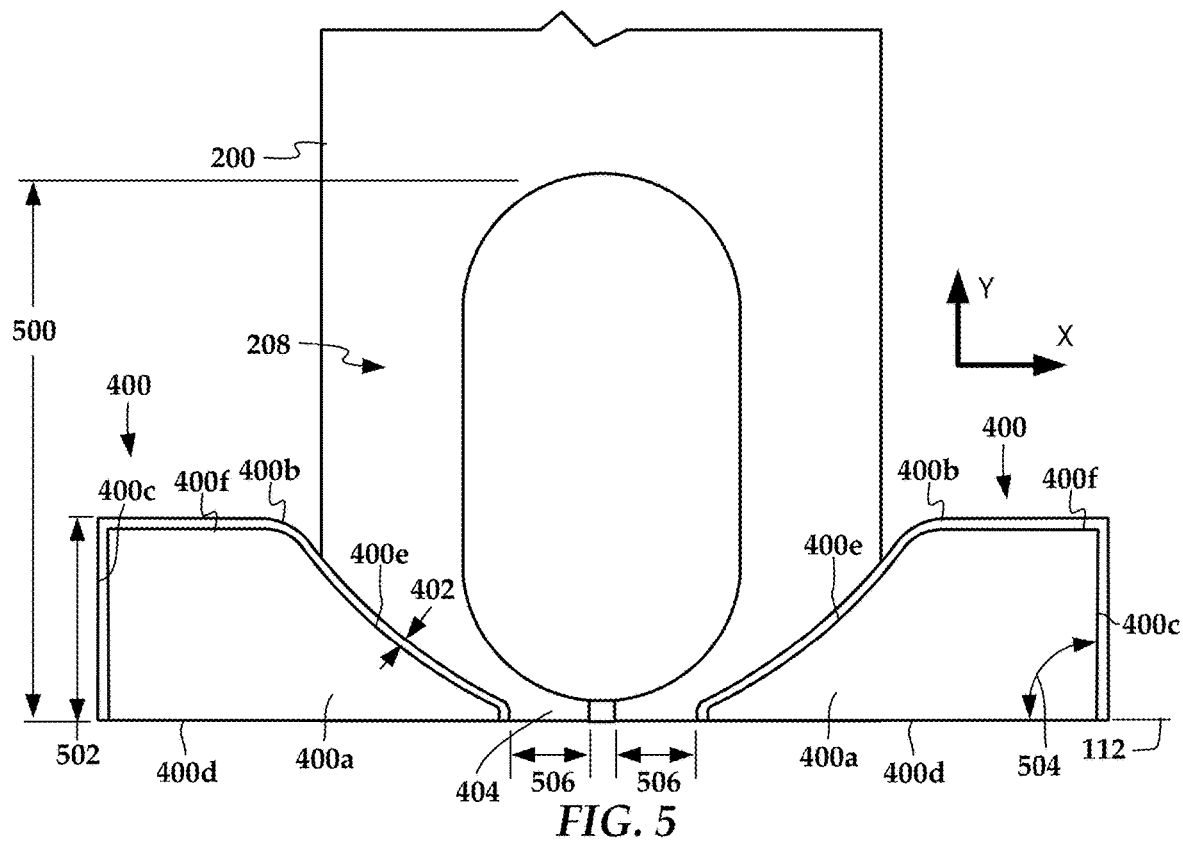

In FIGS. 4 and 5, diagrams illustrate details of a subwavelength mirror according to an example embodiment. The diagram in FIG. 4 is a perspective view seen from the media-facing surface 112 and the diagram in FIG. 5 is a plan view on a substrate-parallel plane. A pair of subwavelength focusing mirrors 400 is located at an end of the waveguide core 200 proximate the media-facing surface 112. The subwavelength focusing mirrors 400 are on opposite crosstrack sides of the near-field transducer 208 and separated from each other by a crosstrack gap 404. The width 408 of crosstrack gap 404 may be less than a corresponding crosstrack width 406 of the NFT 208. For example, the crosstrack gap width 408 may be 200 nm or less, e.g., 160 nm, 120 nm, 75 nm, 50 nm, 40 nm, 30 nm, etc. As seen in FIG. 5, the near-field transducer 208 extends a first distance 500 away from the media-facing surface 112 and the mirrors 400 extend a second distance 502 away from the media-facing surface that is less than the first distance 500. For example, the second distance 502 may be less than half of the first distance 500.

Each of the subwavelength focusing mirrors may include a core structure 400a extending from the media-facing surface 112 and a liner 400b (e.g., a plasmonic material) facing away from the media facing surface 112 and conformally surrounding the core structure 400a. The core structure 400a is a base structure that resembles the final shape of each subwavelength mirror 212, but it need not be made of reflective materials. Generally, the core structure 400a is made from a material that is resistant to mechanical wear and corrosion as part of it is exposed at the media-facing surface. The core structure 400a does not need good optical properties (e.g., reflectivity) however may be selected to have good thermal conductivity for heatsinking, mechanical robustness, as well as being compatible with slider manufacturing processes.

As seen here, the liner 400b extends into the gap 404 and covers back edges 400c of the core 400a that face away from the NFT 208. The back edges 400c are at a non-zero angle 504 to the media-facing surface 112, e.g., 80°-400'. During manufacture, the liner 400b may cover all edges of the core 400a, and then the part of liner material at the media-facing surface can be removed during lapping of the recording head. Note that even though the terms core, base structure, etc. may be used to describe the core structure 400a, this does not imply any order of manufacture of these components. For example, in some embodiments the liner 400b may first be formed to define the shape of the mirrors 400, the liner 400b then being filled in with the material of the core structure 400a.

Note that the liner 400b will be formed within a surrounding dielectric material such as $SiO_2$ or AlO. Depending on the material of the liner 400b, a seed layer and/or adhesion layer may first be formed in the cavity in which the liner will be deposited. The liner thickness 402 may be from 50 nm to 100 nm. In some embodiments, the liner thickness 402 is based on skin depth of the plasmonic metal, e.g., about twice the skin depth, less than four times the skin depth, etc.

In existing designs, the liner 400b is made from a plasmonic metal with good optical characteristics such as Au, Ag, Cu, Al or their alloys. These desirable optical characteristics may include reflectivity, as well as plasmonic resonance, as the mirrors 400 will interact with the plasmon fields generated by the NFT 208. As will be described in detail below, alternative liner materials are considered due to the evanescent coupling caused by a small crosstrack gap between mirrors.

The liner 400b may cover all edges of the mirror 400 except a first edge 400d at the media-facing surface 112. A second edge 400e faces the near-field transducer 208 and the liner 400b covering this edge 400e couples light into the disk of the near-field transducer 208. A third edge 400f faces away from the media facing surface 112. The part of the liner 400b covering this edge 400f controls backscattering that could cause optical feedback into the laser. The liner 400b at the back edges 400c is an artifact of the fabrication process, but may provide some amount of reflection control, e.g., blocking crosstrack stray light from reaching the NFT 208.

The core 400a could be filled by optical quality dielectrics such as AlO and $SiO_2$, but is not limited to these materials as the sensitivity to the core's optical properties is negligible. The core 400a can be made with non-optical quality material. A non-optical quality material may have negligible impact on the performance due to the liner 400b and offers flexibility for the manufacturing process. The core 400a can be made from high thermal conductivity dielectrics like MgO and AlN, which can reduce temperatures at the liner 400b by heat sinking in the crosstrack direction. Other non-metallic core materials may include ceramics, crystalline carbon, etc. In other embodiments, the core 400a can be formed from a robust metal such as Rh, Ir, Pt, Pd, Ru, or their alloys, which can provide mechanical wear resistance, corrosion resistance, and heat sinking. Although some of these metals may be optically absorptive, the use of a plasmonic liner 400b and separation from the critical regions near the NFT 208 will not significantly affect coupling efficiency.

A diffusion barrier or adhesion layer may be formed between the core 400a and liner 400b of the subwavelength mirror 400. The diffusion barrier or adhesion layer is generally referred to herein as an intermediate layer, and is located at or between edges 400e and 400f. For example, if a dielectric core 400a is used with an Au liner 400b, then the intermediate layer may be formed of Ru, which can promote adhesion. In another example, if a Rh core 400a is used with an Al liner 400b, then the intermediate layer may be formed of a metal different than the core and liner 400a, 400b, and having a thickness between 5 and 30 nm. The intermediate layer can prevent diffusion and intermixing between the two metals used to form the core 400a and liner 400b.

Generally, it is further desirable that the intermediate layer does not form inter-metallics with the core and liner 400a, 400b, does not have chemical reactions with the core and liner 400a, 400b, can be small enough (e.g., thickness between 5 and 20 nm) to reduce optical and thermal penalties. The intermediate layer should also tolerate conditions at the media-facing surface, e.g., compatible with surrounding slider materials (including overcoat), no undue protrusion, no non-passivating oxidation response, no corrosion response, etc. Similarly, the material of the core 400a may also be similarly tolerant of conditions at the media-facing surface, as well as having high thermal conductivity and manufacturable (e.g., plating feasibility).

If the intermediate layer is a single layer structure, it may be formed of metals such as Co, Ru, Ti, Cr, Pt, W, Ta, or TiWx, or alloys thereof, or nitrides such as TiNx, TaNx, AlNx, ZrNx, WNx, or HfNx. Any of these metals or nitrides can be combined into a bilayer or multilayer structure that collectively forms the intermediate layer . An intermediate layer of these compositions should be compatible with an Al liner 400b and a core 400a of Au or AuX alloy, Cu or CuX alloy, Pt, Cr, or magnetic alloys currently used for conventional magnetic recording heads such as NiFE20, NiFe55, CoNiFe, FeCo, Ni, or NiCo.

In another embodiment, the intermediate layer may be formed of an oxide that includes the metal of the liner 400b. For an Al liner 400b, the intermediate layer may be a native Al oxide (e.g., $Al_2O_3$) that is formed by natural oxidation, plasma oxidation, ozone exposure, ultraviolet exposure, or radical shower. In another embodiment, the intermediate layer may be formed of an alloy that includes the metal of the liner 400b, such as an Al alloy (e.g., AlMg) for an Al liner.

Figure 6:
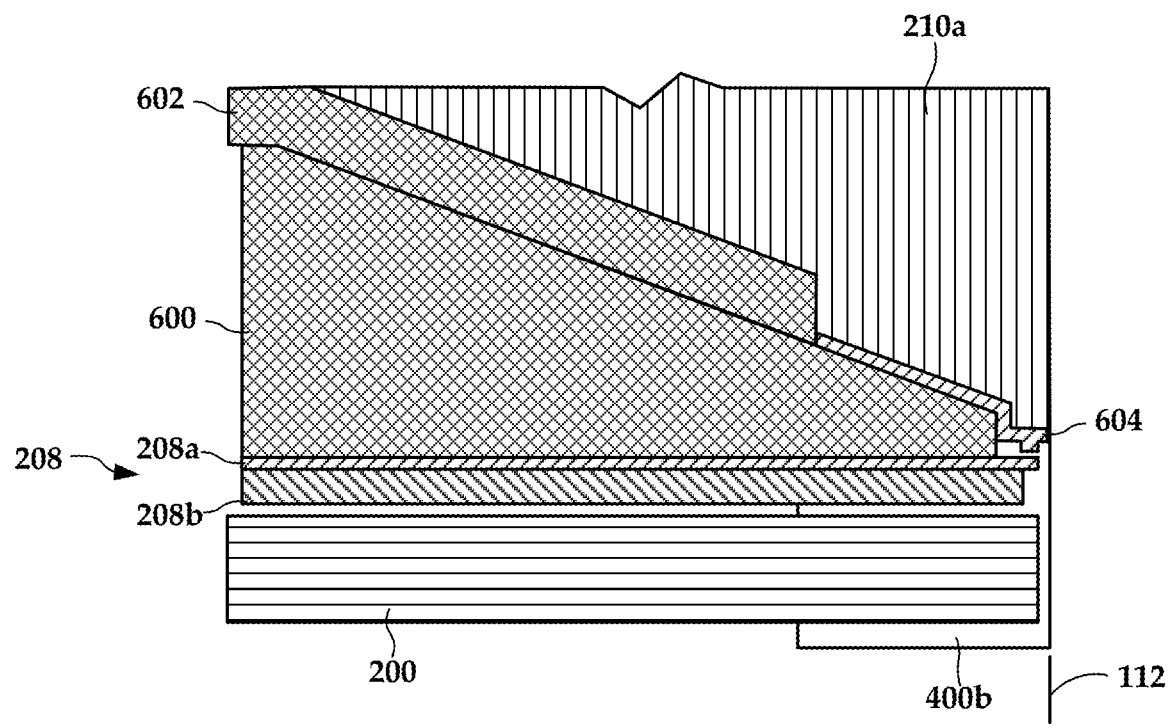
FIGS. 6 and 7 are cross sectional views showing details of a near-field transducer and subwavelength mirror according to example embodiments.
Figure 7:
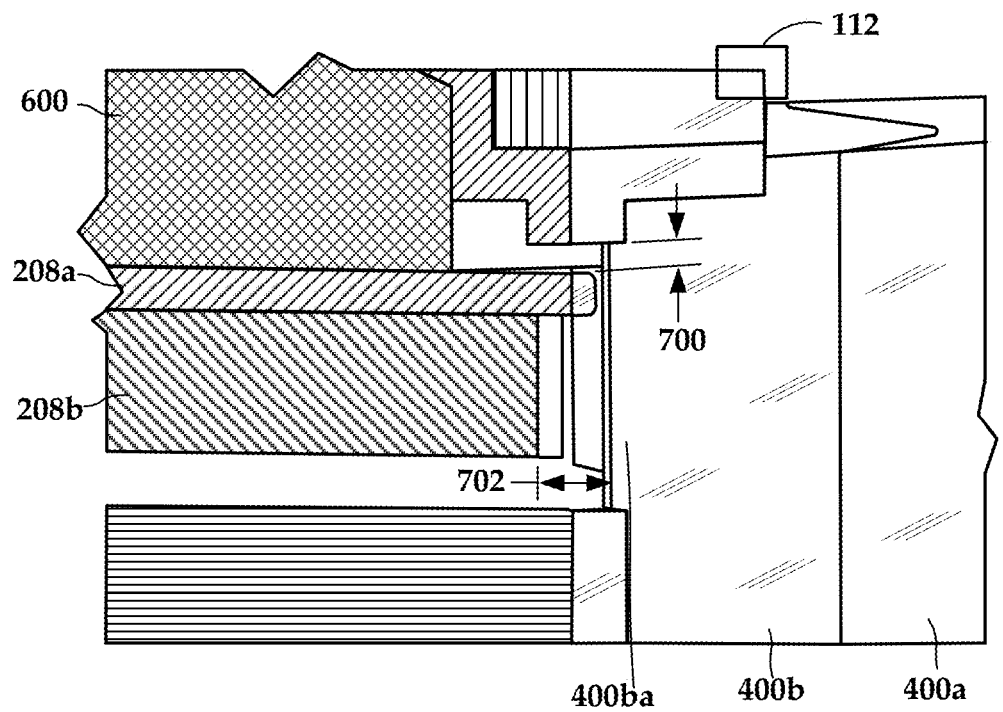

In FIGS. 6 and 7, cutaway views show details of a HAMR head design according to an example embodiment. In this example, the NFT 208 is formed of a peg anchor 208a which is a layer of material (e.g., Ir) have the outline of the enlarged part and peg as seen in FIGS. 4 and 5. A sunken disk 208b is between the peg anchor 208a and the waveguide 200. The sunken disk 208b may be made from an Au or Au alloy, e.g., Au-YOx. A seed layer or adhesion layer between 208b and surrounding dielectrics may be applied to improve the stability of the 208b.

Heat sinks 600, 602 thermally couple the NFT 208 to a write pole 210a, which is a distal part of the magnetic writer 210. A peg coupler 604 is also shown extending between the write pole 210a and the peg part of the peg anchor 208a. The peg coupler 604 (also referred to as an E-resonator) may be formed of Ir and partially fills a downtrack gap between the NFT peg and the write pole 210a. More details of this type of peg coupler 604 can be found in U.S. Pat. No. 10,121,496, dated Nov. 11, 2018.

As seen in FIG. 7, the liner 400b is formed with an extension 400ba that extends toward the NFT peg and reduces a crosstrack gap through which the peg is exposed. This close proximity (e.g., <10 nm) between the liner 400b and peg can result in evanescent interactions which can reduce effectiveness of the NFT 208. Note that in this example, the NFT 208 is excited by light in the red or near infrared part of the spectrum, e.g., 830 nm, or any value between 700 nm to 1500 nm. In order to reduce NFT to side mirror interactions, metals that exhibit plasmonic resonance in the ultraviolet (UV) spectrum might be used for the liner 400b. Such materials may have high extinction coefficient (k) for greater thermal gradient (TG) in the resulting media hotspot.

In Table 1 below, a listing of possible candidate metals is shown with the known or estimated values of n, k, and plasmonic spectral range. A plasmonic material having high k will exhibit high reflection, lower optical power into NFT at writing condition (CPI), and thermal background blocking, the latter benefitting TG. Materials having a high n will limit charges spreading in the mirror from the peg, but may be negative to CPI. Generally, the goal is to lower CPI and increase TG. From this list, Al and In appear to be good candidates due to high k. Mg also has a relatively high k, however n is considerably lower than Al and In.

TABLE 1

| Liner Material | n | k | Spectral range for plasmonics |
| --- | --- | --- | --- |
| Au | 0.19 | 5.39 | Near-infrared |
| Ag | 0.15 | 5.5 | Near UV |
| Pt | 2.92 | 3.89 | Near-infrared |
| Ir | 3.48 | 6.59 | UV |
| Rh | 2.8 | 6.97 | UV |
| Sn | 2.55 | 6.86 | Unknown |
| In | 1.85 | 8 | UV |
| Mg | 0.79 | 7.96 | UV |
| Al | 2.74 | 8.31 | UV |
| Ru | 4.98 | 3.88 | UV |

In Tables 2 and 3 below, results of a simulation were performed for subwavelength mirrors with and without a liner. The crosstrack gap dimension 408 for all of these is 50 nm, with a peg crosstrack width of 22 nm. Thus, the peg is separated from each of the mirrors by a peg-to-mirror gap (see gap 506 in FIG. 5) about 13 nm on each side. The other items listed in the top row are as follows: hPeg—peg height; PCS_abs—peg-to-coupler gap spacing (dimension 700 in FIG. 7) at MFS (media-facing surface); HDSC recess—recess of heat-sink disc 600 from the media-facing surface; pegBP—peg break point (dimension 702 in FIG. 7); WPE—write-plus-erasure track width; mDT-TG—downtrack thermal gradient; CT-TG—crosstrack thermal gradient; pegT—peg temperature; discT—disc temperature; poleT—write pole temperature; CPI—optical writing power; Pabs—light absorption in the heads. Note that the Al liner improves thermal gradient (TG) by the values indicated in parentheses. The Al liner also reduces WPE for higher ADC (areal density capability), CPI and light absorption induced temperature in the sunken disc, discT, and magnetic pole, poleT, which benefit drive performance. This has also been simulated on designs with a smaller peg-to-mirror separation gap 506, e.g., less than 15 nm on each side. Generally, the benefits of using a UV plasmonic mirror liner may be seen when the gap 506 between the mirror and the NFT peg is less than 40 nm.

TABLE 2

| Mirror design | hPeg/PCS_abs/ HDSC recess | pegBP/3σ | WPE | mDT-TG/CT-TG |
|---|---|---|---|---|
| Rh mirror | 12/08/30 | 11.76/1.66 | 20.43 | 14.26/12.52 |
|  | 10/09/30 | 11.06/1.33 | 20.31 | 14.43/12.62 |
| Rh mirror with Al liner | 12/08/30 | 11.85 1.63 | 20.13 | 14.64 (+0.38)/ 12.95 (+0.43) |
|  | 10/08/30 | 10.66/1.38 | 20.05 | 14.76 (+0.33)/ 12.98 (+0.36) |

TABLE 3

| Mirror design | hPeg/PCS_abs/ HDSC recess | pegT rise | discT/poleT | CPI/Pabs |
|---|---|---|---|---|
| Rh mirror | 12/08/30 | 401 | 229/146 | 5.82/3.78 |
|  | 10/09/30 | 408 | 227/142 | 5.73/3.69 |
| Rh mirror with Al liner | 12/08/30 | 402 | 219/128 | 5.22/3.3 |
|  | 10/08/30 | 405 | 219/127 | 5.20/3.26 |

Figure 8:
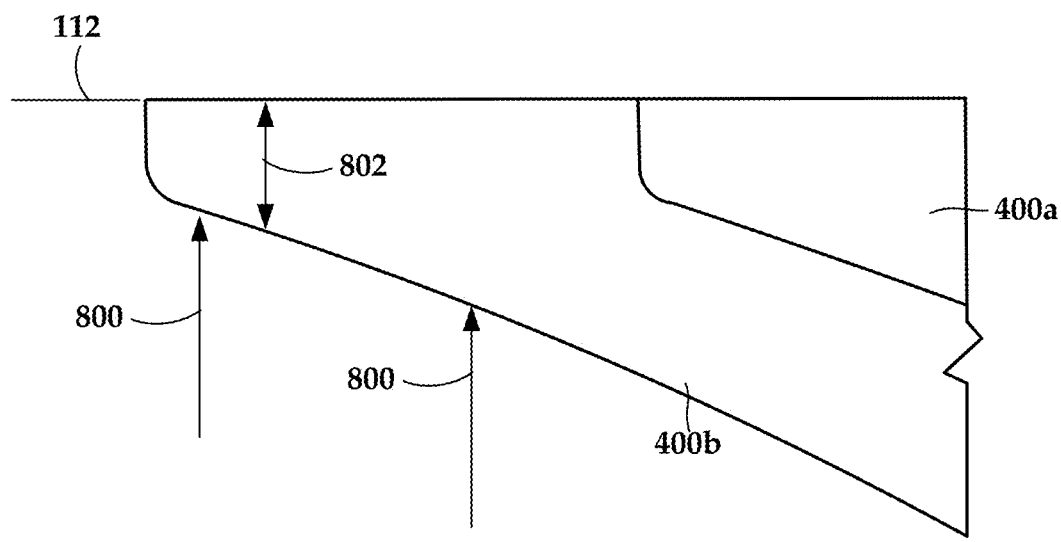
FIGS. 8 is a plan view showing a region of reflection and transmission of a subwavelength mirror according to example embodiments.
Figure 9:
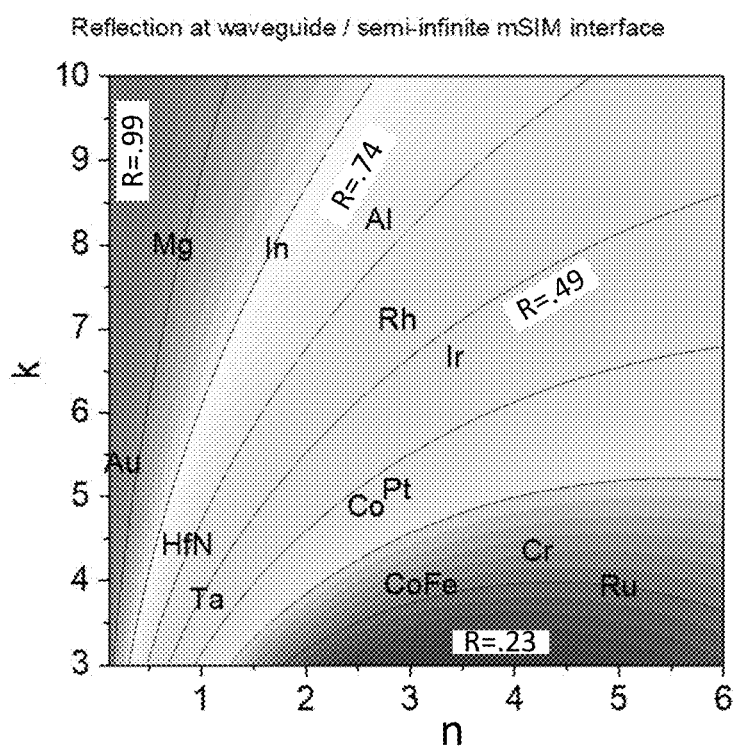
FIGS. 9, 10, and 11 are plots showing reflection and transmission of various subwavelength mirror liner materials according to example embodiments.
Figure 10:
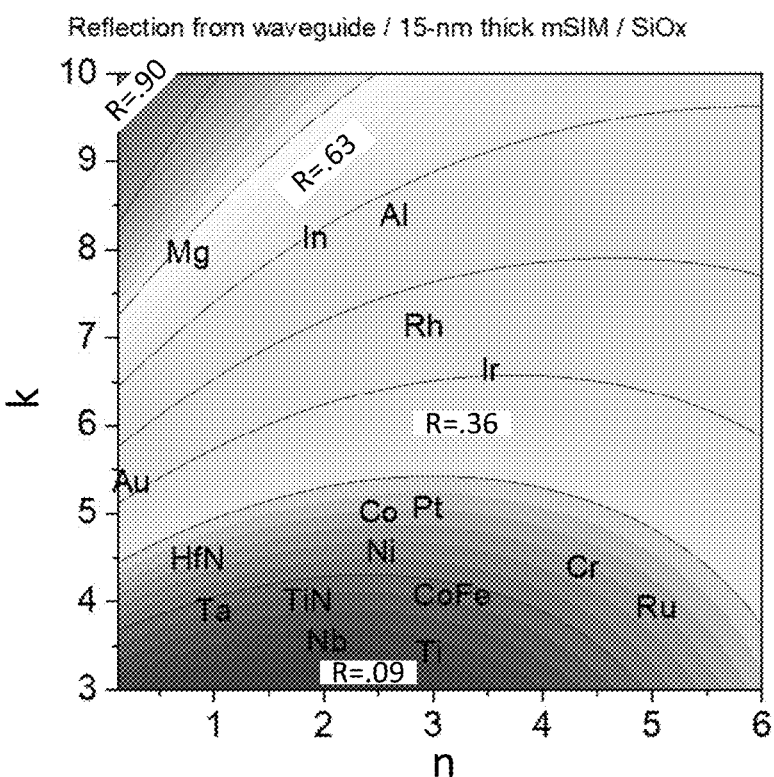
Figure 11:
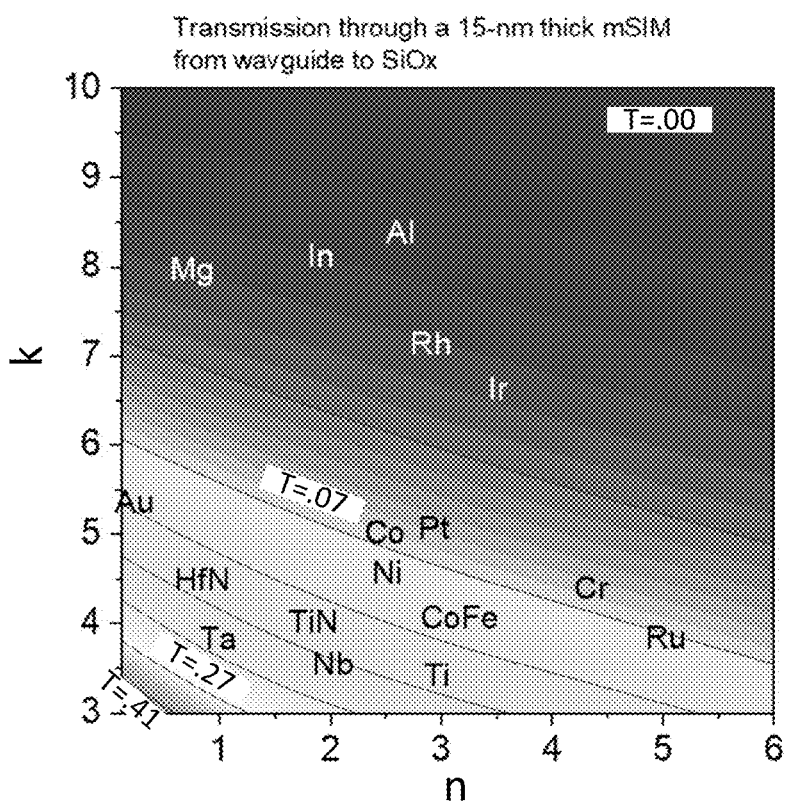

In FIG. 8, a plan view shows a portion of the mirror liner 400b proximate the media-facing surface 112. This portion corresponds to the end of the mirrors that adjoins the NFT peg. An analysis of reflection (R) and transmission (T) of light 800 for various liner materials are shown in the plots of FIGS. 9-11. For NFT efficiency and therefore low peg temperature, high reflection is desired. For good thermal gradient, low transmission and therefore low thermal background (from far field excitation) are preferred. Low thermal background is beneficial near the mirror edge, where the thickness 802 is approximately equal to the pegBP. High k can result in low transmission, and at high k, n is not critical to transmission. High reflection prefers low n, and at high k, sensitivity of reflection to n becomes weak. In these plots, the R and T of Al, In, and Mg are all suitable for this application.

In the near-field zone, an electromagnetic field may be approximated by an electrostatic field. In the electrostatic limit, the impact of a dielectric or metallic semi-infinite medium near a dipole is described by its mirror image, with a "reflection coefficient" $\beta=(\epsilon-\epsilon_m)/(\epsilon+\epsilon_m)$, where $\epsilon_m$ stands for the electric permittivity of the embedded medium where the dipole is placed and $\epsilon$ stands for the electric permittivity of the semi-infinite medium adjacent to the embedded medium. For the electromagnetic field, apart from its oscillations in time, this is a proper approximation for the electric field in the near-field zone above the semi-infinite medium.

Figure 12:
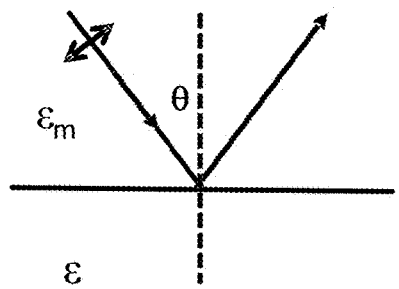
FIG. 12 is a diagram showing concepts related to reflection coefficients for a subwavelength mirror according to an example embodiment.

For a propagating wave incident onto a semi-infinite medium, the reflection coefficient is different from and it also varies with the angle of incidence (spatial frequencies); see the diagram in FIG. 12. The electrostatic mirror image is invalid to evaluate the radiation field from the medium (ε). Considering a p-polarized plane wave incident on the medium (ε) at an angle of incidence θ, the in-plane component of wave vector $k_{//}=k_0\sqrt{\epsilon_m}\sin\theta=k_0\kappa$, κ–spatial frequency, the reflection coefficient $r_p$ is shown below in (1).

$$r_p = \frac{\epsilon\sqrt{\epsilon_m - \kappa^2} - \epsilon_m\sqrt{\epsilon - \kappa^2}}{\epsilon\sqrt{\epsilon_m - \kappa^2} + \epsilon_m\sqrt{\epsilon - \kappa^2}} \quad (1)$$

Based on this, at normal incidence (θ=0;κ=0), $r_p=(\sqrt{\epsilon}-\sqrt{\epsilon_m})/(\sqrt{\epsilon}+\sqrt{\epsilon_m})$. At grazing incidence, $r_p=-1$. For rapidly evanescent waves, $\kappa \gg \sqrt{\epsilon_m}$, $r_p=\beta=(\epsilon-\epsilon_m)/(\epsilon+\epsilon_m)$. Note that β is maximized at the planar resonance condition $$(\epsilon = \epsilon' + i\,\epsilon''): \epsilon' = -\epsilon_m, |\beta| = \sqrt{1 + \left(\frac{2\epsilon_0}{\epsilon''}\right)^2}.$$

Figure 13:
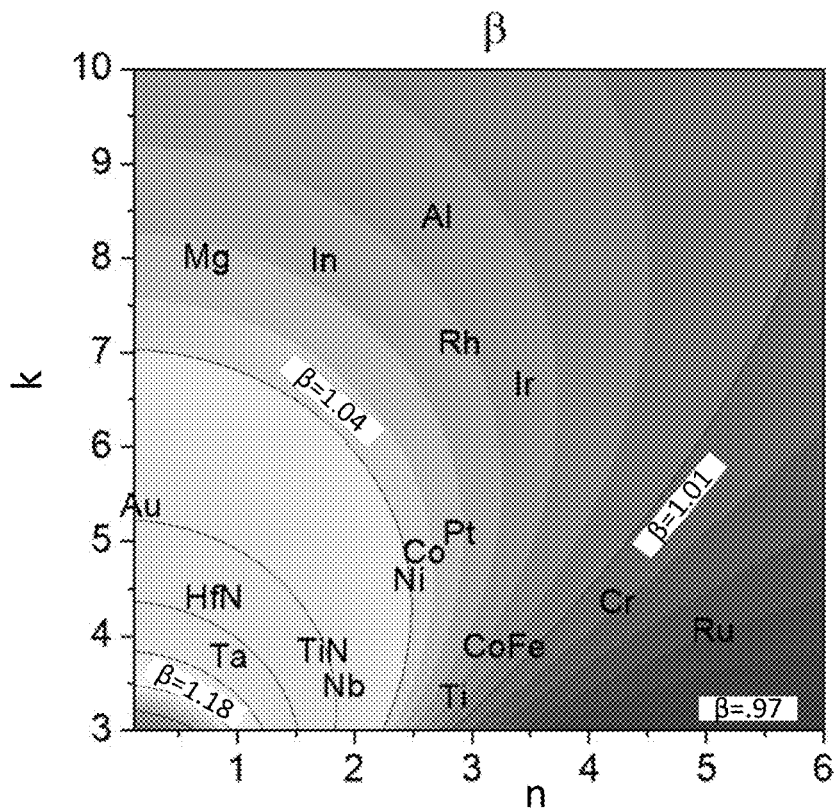
FIG. 13 is a plot showing reflection coefficients for subwavelength mirror liners according to an example embodiment.
Figure 14:
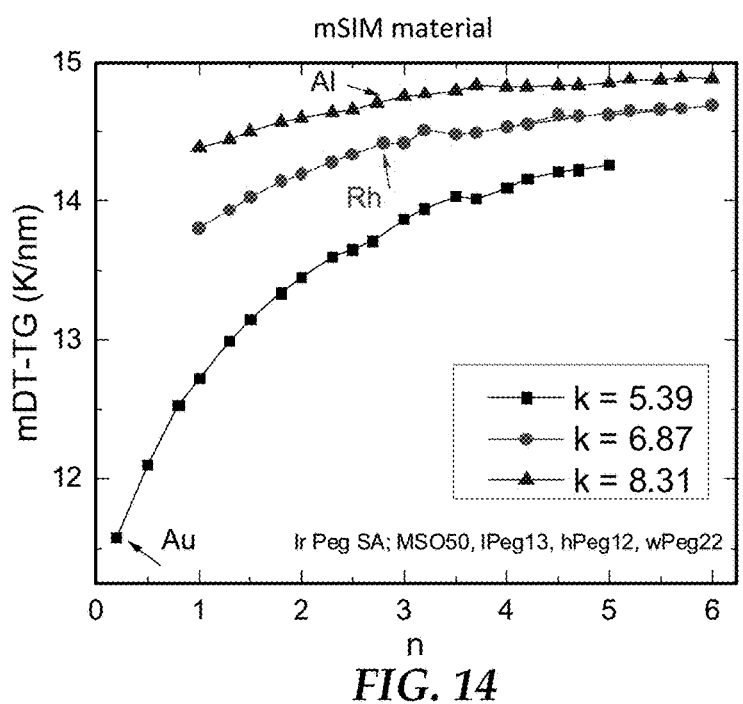
FIGS. 14-20 are plots showing simulation results for a recording head using a subwavelength mirror according to various embodiments.

Assume that the embedded medium is SiOx with the dielectric constant $\epsilon_m/\epsilon_0=(1.46)^2$, and the semi-infinite medium has the complex dielectric constant $\epsilon/\epsilon_0=(n+i\,k)^2$, where n is the refractive index and k is the extinction coefficient. Based on these assumptions, the planar resonance occurs at (n, k)=(0, 1.46), and β is maximized. If this material is used for mSIM liner or the peg coupler, TG is found to be very low and near-field from peg is not confined (very large WPE). See the plots in FIGS. 13 and 14 that illustrates these results. Also based on these assumptions, β becomes smaller at high k or large n; at small k (n), β is very sensitive to n (k). At high k (n), however, this sensitivity becomes weak.

Figure 15:
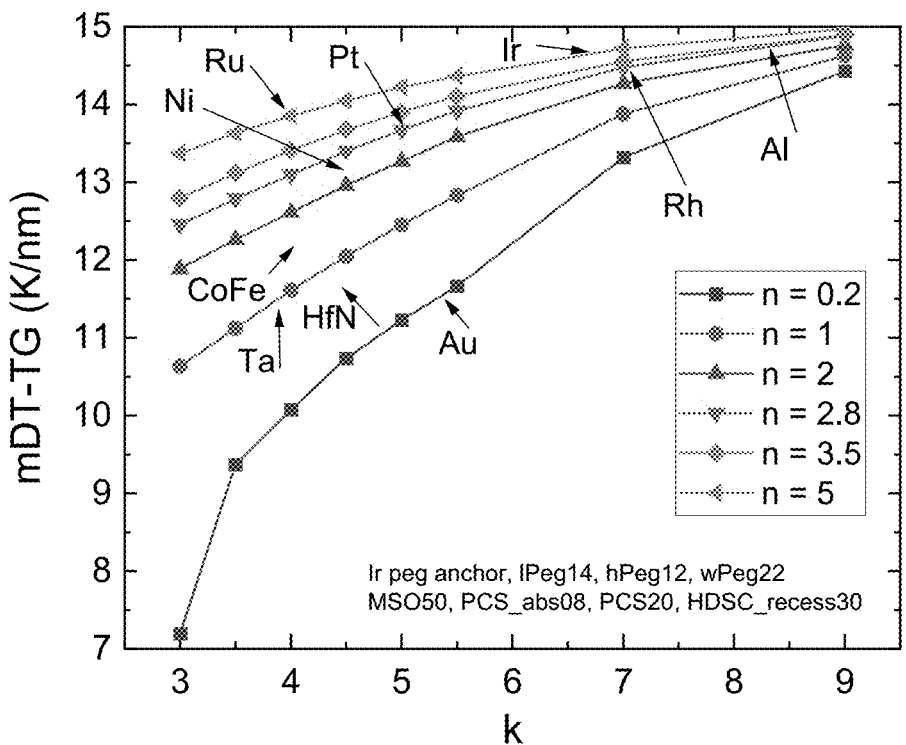
Figure 16:
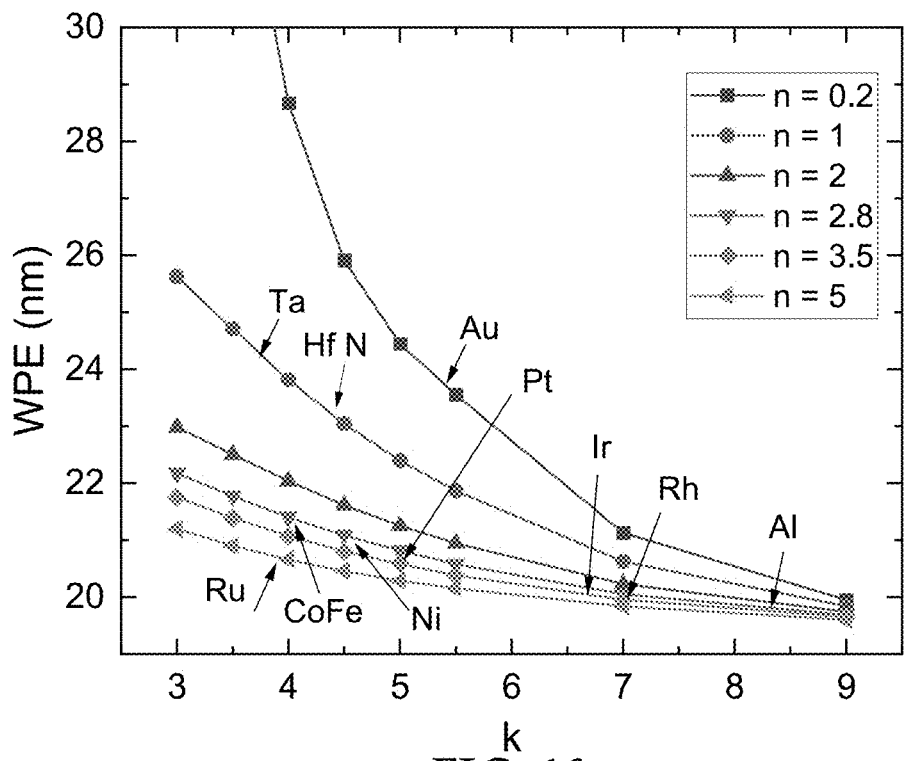

A simulation was performed for a 100-nm thick subwavelength mirror liner 400b over a core 400a made of Rh. The liner 400b has refractive index (n) and extinction coefficient (k). Its thermal conductivity is assumed to be same as that of Rh, 55W/(m K). The results for different liner materials are shown in the graphs of FIGS. 15 and 16. For TG and WPE performance, high k and high n are preferred. At low k, they are very sensitive to n; at high k, the sensitivity becomes weak. Mirror image in the subwavelength mirror negatively impacts the areal density capacity (ADC) performance. The mirror image also negatively affects the NFT efficiency, resulting in large CPI near the planar resonance.

Figure 17:
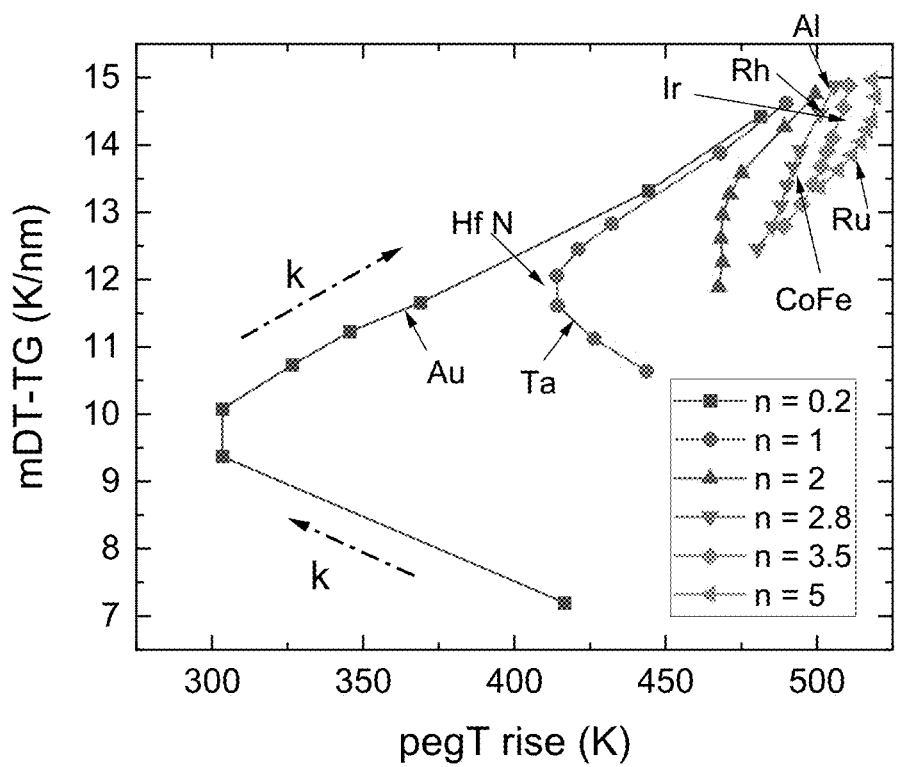

In FIG. 17 a graph of simulation results shows tradeoffs of TG versus pegT increase. At the same TG, a large value of n increases pegT, due to NFT efficiency (lower reflection) and absorption in the subwavelength mirror. A PEC (perfect electric conductor, ε→−∞) could be an ideal liner material. The highest TG achievable occurs at high k and high n (if finite k), due to low transmission (thermal background) and image charge. While PECs do not exist in nature, the concept is a useful model when electrical resistance is negligible compared to other effects.

Figure 18:
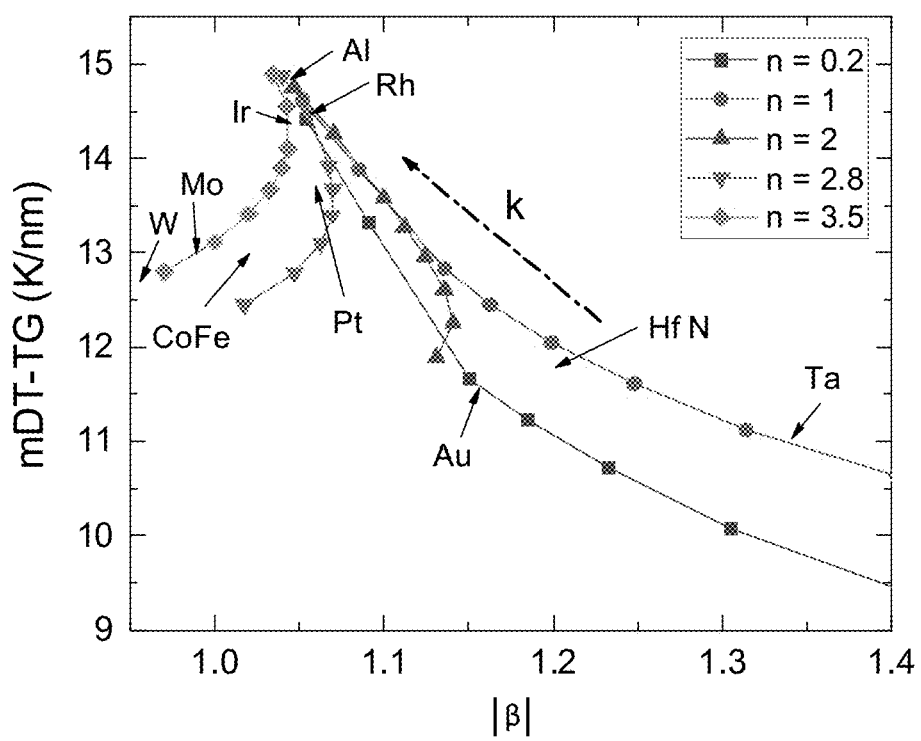

In FIG. 18 a graph of simulation results shows tradeoffs of TG vs the amplitude of β. A value of |β|>~1 is preferred for TG, which occurs at plasmonic material of high k. Note that a PEC has |β|=1 and a dielectric with $\epsilon \gg \epsilon_m$ also has |β|~1, which behaves much like a conductor in that the electric field inside it becomes very small. For |β|>1, strong image charge negatively impacts the TG. A value of |β|<1 is not preferred either, which occurs at a dielectric or refractory metal, due to low reflection from the mirror, resulting in a low NFT efficiency, and low transmission of the propagating excitation waves through the subwavelength mirror, resulting in high thermal background.

Figure 19:
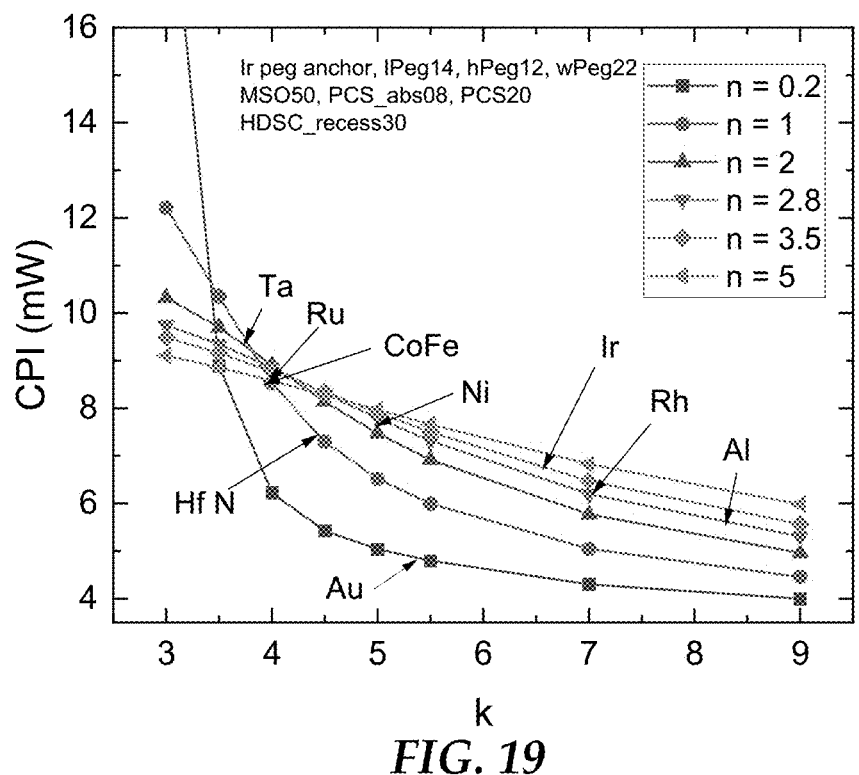
Figure 20:
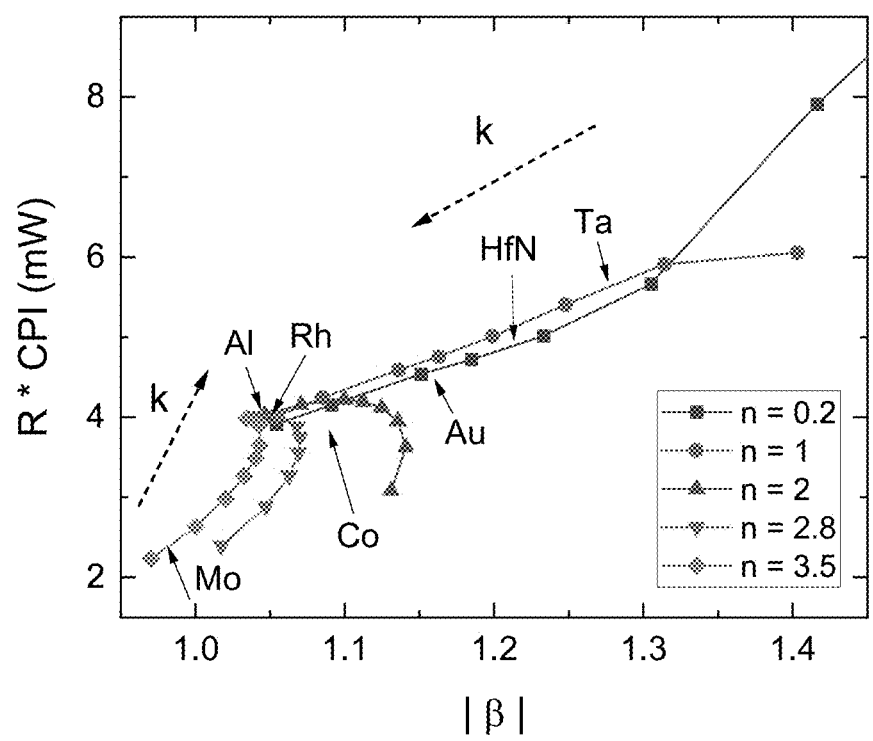

In FIG. 19 a graph of simulation results shows CPI as a function of n and k. As (n, k) is close to the planar resonance at the mirror/SiO$_2$ interface, the NFT efficiency is substantially impacted by the mirror image, resulting in a large spike in CPI at k<4. When (n, k) is far away from the planar resonance, k>4.5, the CPI follows the behavior of reflection: (1) low n is preferred, (2) CPI decreases with increasing k. As seen in the graph of FIG. 20, if mSIM reflection is taken into account, R * CPI versus β shows clear negative impact of image charge.

In summary, induced polarization charges and their spreading at the mirror inner surface negatively impacts the NFT performance (TG, WPE, CPI, pegT), particularly, near the planar resonance at k<4. Materials of high k are preferred for the subwavelength mirror liner, based on the interaction between the NFT and the subwavelength mirror for both evanescent and propagating waves. There are contradictory requirements for n—a small n will obtain high NFT efficiency, yet large n (if k is limited) will mitigate mirror charge and result in low transmission (thermal background). Overall, |β|>→1 achieves the best NFT performance. A PEC (n=0, k →~,|β|=1) might be an ideal material for a subwavelength mirror liner.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise. Generally such terms are used herein to describe an orientation shown in the figure, and unless otherwise specified, are not meant to limit orientation of physical embodiments, e.g., relative to the Earth's surface.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A recording head comprising:
a near-field transducer proximate a media-facing surface of the recording head;
a waveguide that overlaps and delivers light to the near-field transducer, the light having a near-infrared wavelength; and
a pair of subwavelength focusing mirrors at an end of the waveguide proximate the media-facing surface, the subwavelength focusing mirrors located on opposite crosstrack sides of the near-field transducer, the subwavelength focusing mirrors separated from a peg of the near-field transducer at the media-facing surface by a gap of less than 50 nm, each of the subwavelength focusing mirrors comprising:
a core comprising a first edge exposed at the media-facing surface, the core formed of a core material that is resistant to mechanical wear and corrosion; and
a liner covering a second edge of the core facing the near-field transducer, the liner comprising a plasmonic metal that is different than the core material and that has at least one of: a plasmonic frequency in an ultraviolet range; and an extinction coefficient greater than 6.

2. The recording head of claim 1, wherein the liner of each subwavelength focusing mirror is formed of Al or an alloy thereof.

3. The recording head of claim 2, wherein the core of each subwavelength focusing mirror is formed of Rh or an alloy thereof and a diffusion barrier is formed between the core and the liner of each subwavelength focusing mirror.

4. The recording head of claim 3, wherein the diffusion barrier comprises a nitride layer formed TiNx, TaNx, AlNx, ZrNx, WNx, or HfNx, the nitride layer having a thickness between 5 and 30 nm.

5. The recording head of claim I, wherein the liner of each subwavelength focusing mirror is formed of In or an alloy thereof.

6. The recording head of claim 1, wherein the liner of each subwavelength focusing mirror is formed of Mg or an alloy thereof.

7. The recording head of claim 1, wherein the core of each subwavelength focusing mirror is formed of Rh or an alloy thereof.

8. The recording head of claim 1, wherein each liner is less than four times a skin depth of the plasmonic metal.

9. The recording head of claim 1, wherein the near-field transducer comprises:
a peg anchor comprising an enlarged part and the peg extending from the enlarged part; and
a sunken disc between the peg anchor and the waveguide.

10. The recording head of claim 9, wherein the peg anchor is formed of Ir or an alloy thereof, and wherein the sunken disc is formed of Au or an alloy thereof.

11. The recording head of claim 10, further comprising a peg coupler extending from a write pole towards the peg, the peg coupler spaced apart from the peg and formed from Ir.

12. A recording head comprising:
a near-field transducer proximate a media-facing surface of the recording head;
a waveguide that overlaps and delivers light to the near-field transducer, the light having a near-infrared wavelength; and
a pair of subwavelength focusing mirrors at an end of the waveguide proximate the media-facing surface, the subwavelength focusing mirrors located on opposite crosstrack sides of the near-field transducer, each of the subwavelength focusing mirrors comprising:
a core comprising a first edge exposed at the media-facing surface, the core formed of a core material that is resistant to mechanical wear and corrosion; and
a liner covering a second edge of the core facing the near-field transducer, the liner comprising Ir or Mg or alloys thereof.

13. The recording head of claim 12, wherein the core of each subwavelength focusing mirror is formed of Rh or an alloy thereof.

14. The recording head of claim 12; wherein each liner is less than four times a skin depth of the Ir or Mg.

15. The recording head of claim 12, wherein the near-field transducer comprises:
   a peg anchor comprising an enlarged part and the peg extending from the enlarged part; and
   a sunken disc between the peg anchor and the waveguide.

16. The recording head of claim 15, wherein the peg anchor is formed of Ir or an alloy thereof, and wherein the sunken disc is formed of Au or an alloy thereof.

17. The recording head of claim 16, further comprising a peg coupler extending from a write pole towards the peg, the peg coupler spaced apart from the peg and formed from Ir or an alloy thereof.

18. The recording head of claim 12, wherein the sub-wavelength focusing mirrors are separated from a peg of the near-field transducer at the media-facing surface by a gap of less than 50 nm.

\* \* \* \* \*